United States Patent

Kaga et al.

[11] Patent Number: 5,213,643
[45] Date of Patent: May 25, 1993

[54] PNEUMATIC RADIAL TIRE INCLUDING AT LEAST TWO METALLIC BELT CORD LAYERS

[75] Inventors: Yukio Kaga, Atsugi; Tatsuo Suzuki, Hayama; Makoto Takagi; Fumio Tomisawa, both of Hiratsuka, all of Japan

[73] Assignee: The Yokohama Rubber Co., Ltd., Tokyo, Japan

[21] Appl. No.: 617,468

[22] Filed: Nov. 20, 1990

Related U.S. Application Data

[63] Continuation-in-part of Ser. No. 282,425, Dec. 12, 1988, abandoned.

[30] Foreign Application Priority Data

Dec. 18, 1987 [JP] Japan .................................. 62-318922
Dec. 18, 1987 [JP] Japan .................................. 62-318924

[51] Int. Cl.[5] .......................... B60C 9/18; B60C 9/20
[52] U.S. Cl. ...................................... 152/527; 152/526
[58] Field of Search ............ 152/536, 527, 526, 531, 152/528, 529, 535, 534

[56] References Cited

U.S. PATENT DOCUMENTS

| 4,235,274 | 11/1980 | Suzuki et al. | 152/538 X |
| 4,518,024 | 5/1985 | Matsunuma | 152/536 |
| 4,526,217 | 7/1985 | Maeda et al. | 152/536 X |
| 4,702,293 | 10/1987 | Iwata et al. | 152/536 X |
| 4,711,286 | 12/1987 | Kabe et al. | 152/529 X |
| 4,742,858 | 5/1988 | Takahira | 152/536 |
| 5,027,877 | 7/1991 | Tamura et al. | 152/538 X |

FOREIGN PATENT DOCUMENTS

| 59-67108 | 4/1984 | Japan | 152/529 |
| 1-160703 | 6/1989 | Japan | 152/526 |
| 0851898 | 10/1960 | United Kingdom | 152/535 |

OTHER PUBLICATIONS

Peeters et al., "New Developments in Steel Cord for Tyres", *Intl. Polymer Science and Technology*, vol. 11, No. 10, 1984, pp T153–T160.

*Primary Examiner*—Michael W. Ball
*Assistant Examiner*—Adrienne C. Johnstone
*Attorney, Agent, or Firm*—Nikaido, Marmelstein, Murray & Oram

[57] ABSTRACT

A pneumatic radial tire having a carcass layer of cords disposed substantially at a right angle to the circumferential direction, and four belt layers sandwiched between the carcass layer and a tread. A pair of belt layers composed of a second and a third layer in the direction of from the carcass to the tread of the tire have cord layers crossing one another respectively at an angle of 10° to 30° to the circumferential direction, fatigue resistance of the cords of the second layer being significantly greater than fatigue resistance of the cords of the third layer.

3 Claims, 2 Drawing Sheets

PNEUMATIC RADIAL TIRE INCLUDING AT LEAST TWO METALLIC BELT CORD LAYERS

This application is a continuation-in-part of application Ser. No. 282,425 filed Dec. 12, 1988.

BACKGROUND OF THE INVENTION

The present invention relates to a pneumatic radial tire having improved durability of the belt portion and particularly relates to a heavy-load pneumatic radial tire adapted particularly for use in trucks or buses.

For example, in a pneumatic radial tire for use in buses or trucks, the belt layer of the tread portion usually has a four layer structure, and the cords of a second belt layer and those of a third belt layer, in the direction of from a carcass layer to a tread of the tire, cross one another respectively at an angle of 10° to 30° to the circumferential direction of the tire (these second and third belt layers are collectedly referred to as a "cross-ply layer"). This cross-ply layer is a belt layer capable of substantially functioning as a tension band which mainly plays a role of bearing load, internal pressure, etc.

In the above-described cross-ply layer, the second and third belt layers are generally made of the same kind of wire cord in the same end count. However, after the completion of the primary life (i.e., after use of a fresh tire), the fatigue proportion of the cords constituting the second belt layer is larger than that of the cords constituting the third belt layer, which brings about a lowering in the life of the whole cross-ply layer. This unfavorably brings about a lowering in the durability of the belt portion.

SUMMARY OF THE INVENTION

An object of the present invention is to provide a pneumatic radial tire having improved durability of the belt portion of a tire comprising a plurality of belt layers.

Accordingly, the present invention relates to a pneumatic radial tire comprising at least one carcass layer composed of cords disposed at substantially a right angle to the circumferential direction of the tire and a belt layer sandwiched between said carcass layer and a tread and composed of at least two metallic cord layers and further a pair of layers crossing each other and capable of functioning substantially as a tension band, wherein with respect to said belt layers crossing each other and capable of functioning substantially as a tension band, either the total tenacity of the belt layer located on the side of said carcass layer is larger than that of the belt layer located on the side of the tread or the fatigue resistance of the cords of said belt layer located on the side of the carcass layer is significantly greater than the cords of said belt layer located on the side of said tread.

DETAILED DESCRIPTION OF THE PREFERRED EMBODIMENTS

Figure 1:
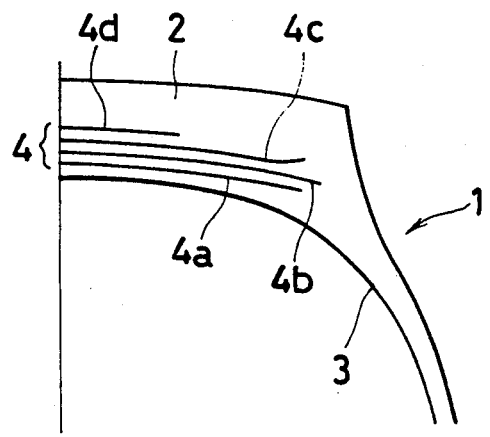
FIG. 1 is an explanatory meridian semicross-sectional view of an example of a pneumatic radial tire according to the present invention.

In FIG. 1, a belt layer 4 composed of metallic cords is disposed between a carcass layer 3 and a tread 2. The carcass layer 3 has a single or multilayer structure and metallic cords or organic fiber cords disposed at substantially right angle to the circumferential direction of the tire. The belt layer 4 is composed of at least two layers and, in the case of FIG. 1, composed of a first belt layer 4a, a second belt layer 4b, a third belt layer 4c, and a fourth belt layer 4d provided in that order from the carcass layer towards the tread 2. The cords of the second belt layer 4b and the cords of the third belt layer 4c cross one another respectively at an angle of 10° to 30° to the tire circumferential direction (i.e., constitute a cross-ply layer).

According to the present invention, in the above-described pneumatic radial tire having a belt structure composed of at least two layers, the total tenacity of the second belt layer 4b is larger than that of the third belt layer 4c. Alternatively, the cords used for the second belt layer 4b have fatigue resistance significantly greater than the fatigue resistance of the cords of the third belt layer 4c. This expedient is taken for the purpose of optimizing the fatigue life of the cords constituting each belt layer according to the travel life of the tire because the use of a fresh tire causes the fatigue of the cords constituting the second belt layer 4b to be greater than that of the cords constituting the third belt layer 4c.

For purposes of the present invention, the above term "fatigue resistance" means a resistance to rupture of cords by bending. The term "total tenacity" used herein is intended to mean "cord tenacity x end count of cords". It is preferred that the total tenacity of the second belt layer 4b be larger than that of the third belt layer 4c by a factor of 1.2 to 1.4. When the total tenacity of the second belt layer 4b is larger than that of the third belt layer 4c by a factor of less than 1.2, it is difficult to optimize the fatigue life of the cords and the travel life of the tire. On the other hand, when the total tenacity of the second belt layer 4b is larger than that of the third belt layer 4c by a factor exceeding 1.4, the amount of rubber present between the cords is very small, which brings about a break of the belt due to the contact of the cords. This unfavorably lowers the travel life of the tire.

Further, the expression "the cords used for the second belt layer 4b having fatigue resistance significantly grater than that of the cords used for the third belt layer 4c" is intended to mean, for example, steel cords having good fatigue resistance improved by varying filament material constituting the cords, twisting structure, thickness, etc. of the cords. The cords having significantly better fatigue resistance may be used as the cords for the second belt layer 4b. With respect to the end count of the cords, the second belt layer 4b is the same as the third belt layer 4c.

Figure 2:
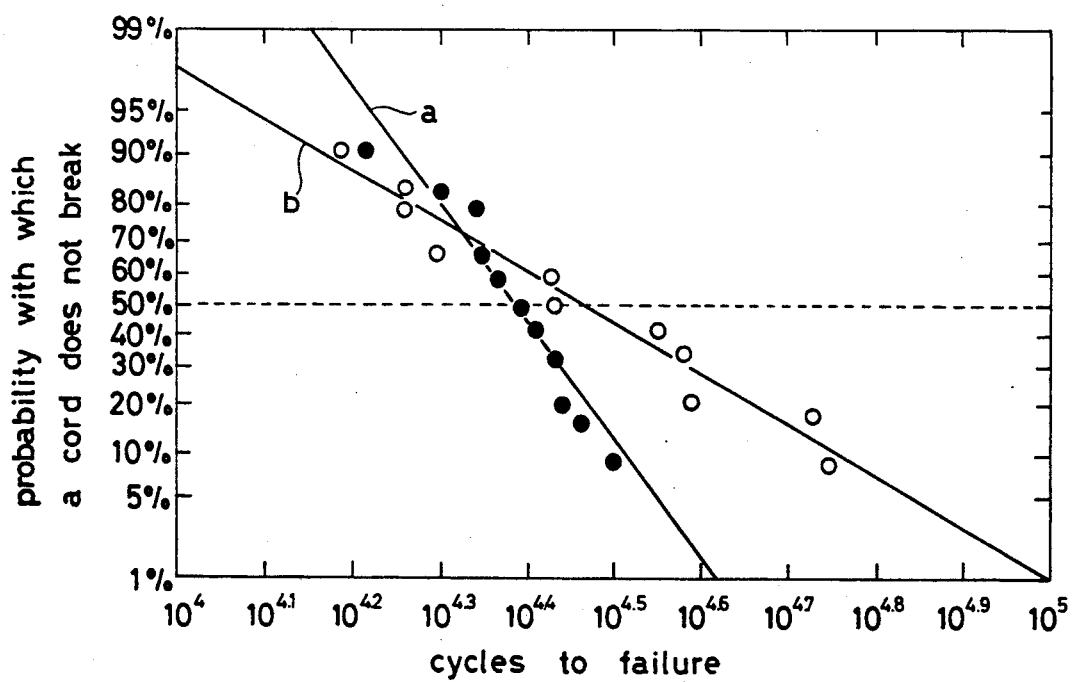
FIG. 2 is an explanatory view showing the results of a rotary bending fatigue test of a cord in a belt layer wherein each spot shows probability with which a cord does not break when undergone the number of bendings (cycles to failure) shown in the axis of abscissa.

FIG. 2 shows the results of the following rotary bending fatigue test. In the drawing, line a and line b represent the results with respect to the cords of the second belt layer 4b and the third belt layer 4c, respectively. It is apparent from FIG. 2 that the fatigue of the cords of the second belt layer 4b is larger than that of the cords of the third belt layer 4c.

Rotary bending fatigue test

A test (internal road test) was conducted by making use of an actual vehicle under the following conditions. After the tire was travelled by 40,000 km, the steel cords of the second belt layer 4b and third belt layer 4c were taken out and applied to the rotary bending fatigue test.

Conditions of test by making use of actual vehicle tire size: 10.00 R20 14PR
rim size: 7.00 T×20
internal pressure of tire: 7.25 kgf/cm$^2$
load: JIS normal load
position of mounting: rear wheel biaxial type (2-D.D); driving shaft of dump truck
travelling road: unpaved road ratio 16%
average travel speed: 45 km/hr
sample under test: steel cord (4b, 4c) 3(0.20)+6(0.38)

The present invention will now be described with reference to the following example.

EXAMPLE

The durability of the belt portion was evaluated on the following tires of the present invention and comparative tires. The results are shown in terms of index in the following Table 1 (1) and Table 1 (2).

Figure 3:
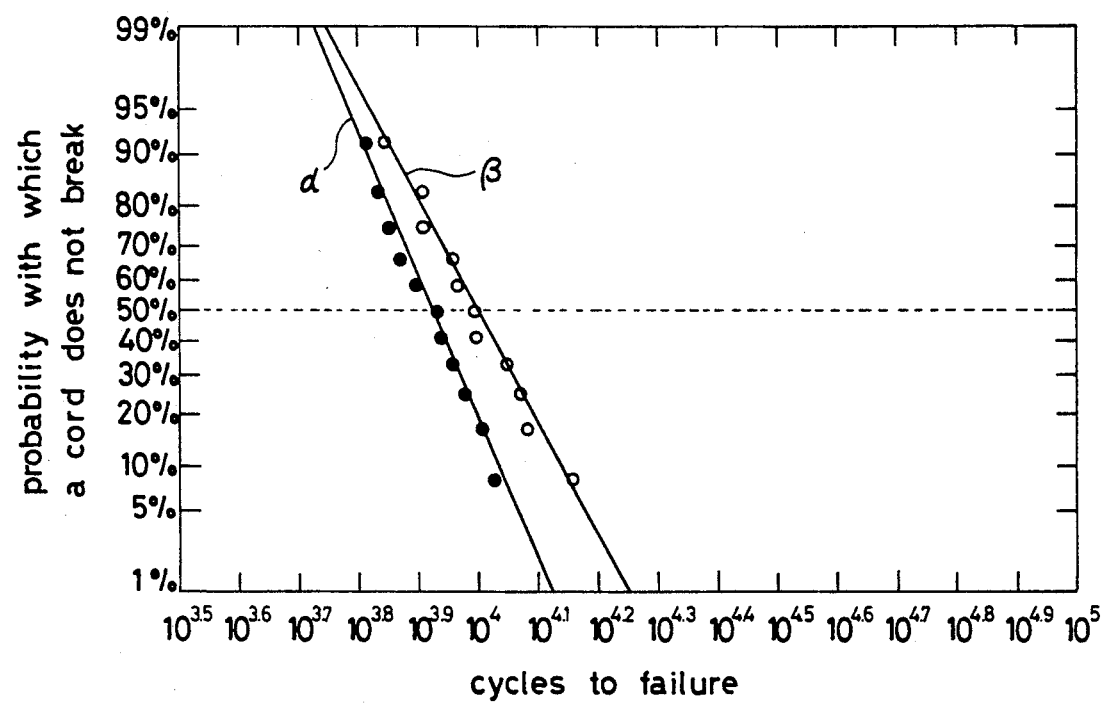
FIG. 3 is an explanatory view showing the results of a rotary bending fatigue test of another cord wherein each spot shows probability with which a cord does not break when undergone the number of bendings (cycles to failure) shown in the axis of abscissa.

(a) Tire 1 of the present invention:
A pneumatic radial tire having a structure of a belt portion shown in FIG. 1.
cords of second belt layer 4b: steel cords
cords of third belt layer 4c: steel cords
end count of second belt layer 4b: 33 ends
end count of third belt layer 4c: 26 ends
total tenacity of second belt layer 4b: 1.3 times larger than the total tenacity of the third belt layer 4c (b) Comparative tire 1:
A pneumatic radial tire having a structure of a belt portion shown in FIG. 1.
cords of second belt layer 4b: the same steel cords as those of the above-described tire of the present invention
cords of third belt layer 4c: the same steel cords as those of the above-described tire of the present invention
end count of second belt layer 4b: the same as that of third belt layer 4c (26 ends)
total tenacity of second belt layer 4b: the same as that of the third belt layer 4c (c) Tire 2 of the present invention:
A pneumatic radial tire having a structure of a belt portion shown in FIG. 1.
cords of second belt layer 4b: steel cords having same twisting structure [3(0.20)+6(0.38)] as that of the cords of third belt layer 4c and constituted by different filament material in comparison with the cords of third belt layer 4c
cords of third belt layer 4c: steel cords
end count of cords of second belt layer 4b: the same as that of cords of third belt layer 4c (26 ends)
fatigue resistance of cords of second belt layer 4b: better than that of the cords of the third belt layer 4c The fatigue resistance of cords is estimated by the results of the rotary bending fatigue test described previously. FIG. 3 shows the results of the test. In the drawing, line α represent the results with respect to the fresh cords used for a conventional tire, line β the results with respect to the fresh cords used for the tire of the present invention, respectively. It is apparent from FIG. 3 that the fatigue resistance of the cords used for the tire of the present invention is better than that of the cords used for a conventional tire.

(d) Comparative tire 2:
A pneumatic radial tire having a belt portion structure shown in Table 1.
cords of second belt layer 4b: steel cords
cords of third belt layer 4c: steel cords
end count of cords of second belt layer 4b: the same as that of cords of third belt layer 4c (26 ends)
fatigue resistance of cords of second belt layer 4b: the same as that of cords of third belt layer 4c

Method of evaluating durability of belt portion

An indoor drum test was conducted under the following conditions, and the durability of the belt portion was evaluated based on load at failure.

Test conditions tire size: 10.00 R20 14PR
rim, internal pressure, and load: according to JIS normal conditions
travel speed: 45 km/hr
slip angle: ±3°

|  | Test results (1) | | Test results (2) | |
| --- | --- | --- | --- | --- |
|  | tire 1 of the present invention | comparative tire 1 | tire 2 of the present invention | comparative tire 2 |
| load at failure | 4320 (160%)* | 3920 (145%)* | 4510 (160%)* | 3920 (145%)* |

Note:
*proportion relative to JIS normal load

TABLE 1 (1)

|  | tire 1 of the present invention | comparative tire 1 |
| --- | --- | --- |
| durability of belt portion | 110.2 | 100 |

TABLE 1 (2)

|  | tire 2 of the present invention | comparative tire 2 |
| --- | --- | --- |
| durability of belt portion | 115.1 | 100 |

It is apparent from Table 1 (1) and Table 1 (2) that the tires of the present invention are significantly greater than the comparative tires in the durability of the belt portion.

As described above, according to the present invention, either the total tenacity of the second belt layer is larger than that of the belt layer of the third layer or the fatigue resistance of the cords of the second belt layer is significantly greater than that of the cords of the third layer, so that it is possible to not only improve the durability of the belt portion but also attain the following effects.

(1) The durability of the belt portion of the casing after retreading can be improved.

(2) Even when the end count of cords of the second belt layer is the same as that of the conventional tire and the end count of cords of the third belt layer is reduced, the durability of the belt portion can be ensured, which makes it possible to reduce the weight and cost of the tire.

What is claimed is:

1. A pneumatic radial tire comprising at least one carcass layer composed of cords disposed at substantially a right angle to the circumferential direction of the tire and four belt layers sandwiched between said carcass layer and a tread, said four belt layers including at least two metallic cord layers and having a pair of layers capable of substantially functioning as a tension band, wherein said pair of layers are composed of a second belt layer and a third belt layer in the direction of from the carcass layer to the tread of the tire, fatigue resistance of the cords of said second belt layer being significantly greater than fatigue resistance of the cords of said third belt layer, wherein the cords of said third belt layer are each a steel cord, and the cords of said second belt layer are each a steel cord.

2. A pneumatic radial tire according to claim 1, wherein the cords of said carcass layer are each a metallic cord.

3. A pneumatic radial tire according to claim 1, wherein the cords of said carcass layer are each an organic fiber cord.

* * * * *